(12) United States Patent
Zhang (10) Patent No.: US 11,500,062 B2
(45) Date of Patent: Nov. 15, 2022

(54) ACCELERATION-BASED FAST SOI PROCESSING

(71) Applicant: DSCG SOLUTIONS, INC., Chantilly, VA (US)

(72) Inventor: Xiyong Zhang, Rockville, MD (US)

(73) Assignee: DSCG Solutions, Inc., Chantilly, VA (US)

( * ) Notice: Subject to any disclaimer, the term of this patent is extended or adjusted under 35 U.S.C. 154(b) by 629 days.

(21) Appl. No.: 16/441,934

(22) Filed: Jun. 14, 2019

(65) Prior Publication Data

US 2019/0383907 A1 Dec. 19, 2019

Related U.S. Application Data

(60) Provisional application No. 62/686,285, filed on Jun. 18, 2018.

(51) Int. Cl.
*G01S 7/48* (2006.01)
*G01S 17/50* (2006.01)
*G10L 25/48* (2013.01)
*G06F 3/16* (2006.01)

(52) U.S. Cl.
CPC ............ *G01S 7/4808* (2013.01); *G01S 17/50* (2013.01); *G06F 3/162* (2013.01); *G10L 25/48* (2013.01)

(58) Field of Classification Search
None
See application file for complete search history.

(56) References Cited

U.S. PATENT DOCUMENTS

| 8,687,173 | B2 | 4/2014 | Rezk et al. |
| 9,877,114 | B2 | 1/2018 | Sebastian et al. |
| 10,555,079 | B2 * | 2/2020 | Bakish ............... G10L 21/0216 |
| 2011/0273699 | A1 | 11/2011 | Sebastian et al. |
| 2018/0063647 | A1 | 3/2018 | Blumkin et al. |

OTHER PUBLICATIONS

International Search Report and Written Opinion for International Application No. PCT/US2019/037541, dated Sep. 10, 2019, 10 pages.
Extended European Search Report for European Application No. 19822609.4, dated Feb. 23, 2022, 10 pages.
Li et al., "LDV Remote Voice Acquisition and Enhancement", The 18th International Conference on Pattern Recognition (ICPR '06), pp. 262-265, Aug. 20, 2006, XP055717974.

* cited by examiner

*Primary Examiner* — Eric L Bolda
(74) *Attorney, Agent, or Firm* — Brake Hughes Bellermann LLP (57) ABSTRACT

Techniques of deriving audio signals using frequency modulated continuous-wave (FMCW) LIDAR use an acceleration-based algorithm in which an audio signal is based on a difference in velocity between two up-chirps or two-down-chirps. Such an acceleration-based algorithm takes less computation, results in fast processing, boosts the high frequency component of the audio signals which the velocity-based algorithm lacks, and improves the subjective intelligibility. For example, in the acceleration-based algorithm, the DC components may be safely ignored in many cases. In such cases, the system does not require a band-pass filter as in the conventional systems, thus reducing computational burden. Moreover, the acceleration-based algorithm emphasizes high frequencies that form a more realistic depiction of human speech.

20 Claims, 7 Drawing Sheets

Transmit a first beam with alternating up-chirp and down-chirp portions 602

↓

Receive a second beam with alternating up-chirp and down-chirp portions, each portion having a respective doppler frequency 604

↓

Generate a portion of an audio signal based on a difference between doppler frequencies of adjacent up-chirp or adjacent down-chirp portions of the second beam corresponding to the up-chirp or down-chirp potions of the first beam 606

FIG. 6

ACCELERATION-BASED FAST SOI PROCESSING

RELATED APPLICATIONS

This application claims priority to U.S. Provisional Patent Application No. 62/686,285, filed Jun. 18, 2018, entitled "ACCELERATION-BASED FAST SOI PROCESSING," the disclosure of which is hereby incorporated by reference in its entirety.

TECHNICAL FIELD

This description relates to an audio detection system including a multiple beam laser LIght Detection And Ranging (LIDAR) system.

BACKGROUND

In some known LIDAR systems, lasers may be used to track objects. Some LIDAR systems may also be used to convert object vibrational velocity into audio signals. However, known LIDAR systems used in object tracking and audio signal conversion are often relatively slow, inefficient, and/or inaccurate. Thus, a need exists for systems, methods, and apparatus to address the shortfalls of present technology and to provide other new and innovative features.

DETAILED DESCRIPTION

Conventional LIDAR-based tracking systems use a velocity-based vibration processing algorithm. For example, such a LIDAR tracking system may emit a laser beam with a pattern of optical frequencies such as a triangle function pattern of frequencies over time. When such a beam is reflected off an object, a combination of the transmitted beam and reflected beam form a beat frequency from which a range may be deduced. In addition, when the object has a vibration velocity field, the Doppler frequency shift that results is proportional to the vibration velocity. In a conventional LIDAR-based tracking system, it is this vibration velocity that determines the audio signal.

In the above-described conventional LIDAR-based tracking systems, the vibration velocity has a DC component that may overwhelm the systems' ability to estimate the audio signals accurately. Accordingly, some conventional LIDAR-based tracking systems use an attenuation band-pass filter to remove the DC component of the vibration velocity signal. Nevertheless, such a filter adds a computational burden to the LIDAR-based tracking systems, which are already performing computations of audio signals in real time. Such additional computation would degrade the performance of such LIDAR-based tracking systems In contrast to the above-described conventional LIDAR-based tracking systems, improved techniques use an acceleration-based algorithm in which an audio signal is based on a difference in velocity between two up-chirps or two down-chirps. Such an acceleration-based algorithm takes less computation, results in fast processing, boosts the high frequency component of the audio signals which the velocity-based algorithm lacks, and improves the subjective intelligibility. For example, in the acceleration-based algorithm, the DC components may be safely ignored in many cases. In such cases, the system does not require a band-pass filter as in the conventional systems, thus reducing computational burden. Moreover, the acceleration-based algorithm emphasizes high frequencies that form a more realistic depiction of human speech. The model for this acceleration-based SOI processing is described below.

Figure 1:
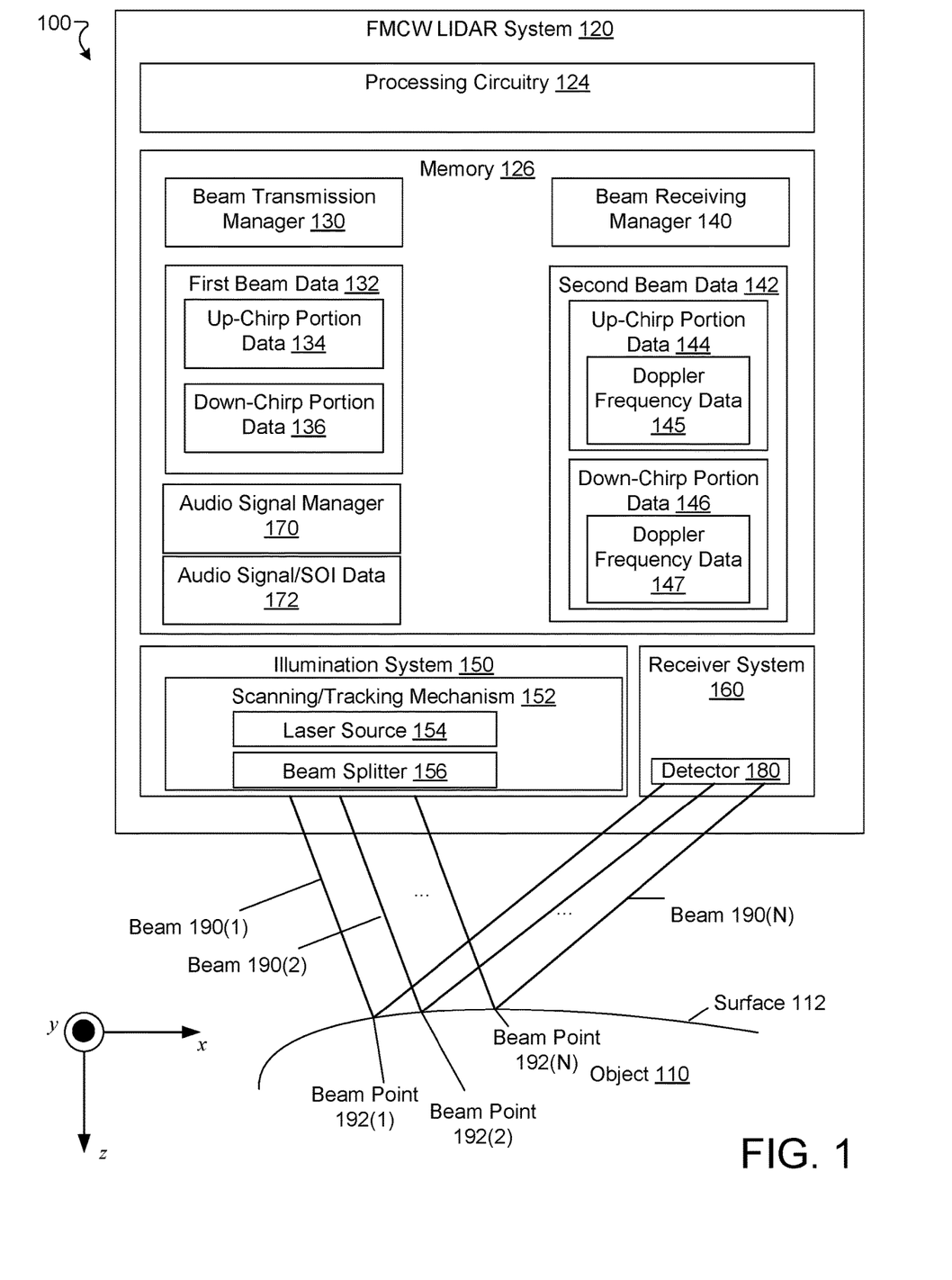
FIG. 1 is a diagram illustrating an example frequency-modulated continuous-wave (FMCW) LIDAR system for performing acceleration-based fast SOI processing according to the improved techniques.

FIG. 1 is a diagram that illustrates an example electronic environment 100 in which improved techniques of tracking an object's motion are performed. The electronic environment 100 includes a FMCW LIDAR system 120 that is configured to use an acceleration-based processing algorithm to produce an audio signal.

The object 110 is assumed herein to be a rigid body of some unknown shape. For example, the object 110 may be a human face. The object 110 is assumed to be in motion, both linear and rotational, about an arbitrary axis. It should be understood that in the electronic environment shown in FIG. 1, there is a natural axis of symmetry that is seen to be substantially normal to the orientation of the object.

As shown in FIG. 1, the FMCW LIDAR system 120 is a single, integrated unit that includes a processing circuitry 124, memory 126, an illumination system 150, and a receiver system 160. In some arrangements, the tracking system 120 takes the form of a handheld unit that may be pointed at the object 110. However, in other arrangements the components of the tracking system 120 may be distributed among different units (e.g., the processing circuitry 124 and memory 126 might be in a computing device separate from a handheld device that includes the illumination system 150 and the receiver system 160).

The processing circuitry 124 includes one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some arrangements, one or more of the components of the tracking system 120 can be, or can include, processors configured to process instructions stored in the memory 126. For example, a beam transmission manager 130 (and/or a portion thereof), a beam receiving manager 140, and an audio signal manager 170 (and/or a portion thereof) shown as being included within the memory 126 in FIG. 1, can be a combination of a processor and a memory configured to execute instructions related to a process to implement one or more functions.

The beam transmission manager 130 is configured to cause the illumination system 150 to generate a beam of electromagnetic radiation having a specified frequency profile represented by first beam data 132. Specifically, the beam includes a sequence of up-chirp portions and a sequence of down-chirp portions such that an up-chirp portion is followed by a down-chirp portion and vice-versa. In some implementations, the specified frequency profile is a sawtooth wave profile, with the up-chirp portions represented by the positively-sloped parts of the sawtooth wave profile and the down-chirp portions represented by the negatively sloped parts of the sawtooth wave profile.

The first beam data 132 represents the frequency profile of the transmitted beam. As discussed above, the frequency profile of the transmitted beam includes a sequence of up-chirp portions and a sequence of down-chirp portions such that an up-chirp portion is followed by a down-chirp portion and vice-versa. As shown in FIG. 1, the first beam data 132 includes up-chirp portion data 134 and down-chirp portion data 136. The up-chirp portion data 134 represents the up-chirp portions and the down-chirp portion data 136 represents the down-chirp portions. In some arrangements, each of the up-chirp portion data 134 and down-chirp portion data 136 includes samples of the frequency as a function of time over each portion to be repeated in the beam as represented by the first beam data 132. In some implementations, each of the up-chirp portion data 134 and down-chirp portion data 136 includes parameter values describing a functional form of each portion. For example, when the frequency profile is a sawtooth wave profile, relevant parameters for each of the up-chirp and down-chirp portions include respective slope values and sampling rates.

The beam receiving manager 140 is configured to cause the receiver system 160 to detect and process beams of electromagnetic radiation reflected from the object 110. Such reflected beams may have a frequency profile, represented by second beam data 142, that is based on the frequency profile of the transmitted beam of electromagnetic radiation. As shown in FIG. 1, the second beam data 142 includes up-chirp portion data 144 and down-chirp portion data 146. In addition, the second beam data 142 includes doppler frequency data 146.

The second beam data 142 represents the frequency profile of the reflected beam. As discussed above, the frequency profile of the transmitted beam is similar in form to the transmitted beam and accordingly includes a sequence of up-chirp portions and a sequence of down-chirp portions such that an up-chirp portion is followed by a down-chirp portion and vice-versa. As shown in FIG. 1, the second beam data 142 includes up-chirp portion data 144 and down-chirp portion data 146. As with the first beam data 132, the up-chirp portion data 144 represents the up-chirp portions and the down-chirp portion data 146 represents the down-chirp portions. In some arrangements, each of the up-chirp portion data 144 and down-chirp portion data 146 includes samples of the frequency as a function of time over each portion to be repeated in the beam as represented by the second beam data 142. In some implementations, each of the up-chirp portion data 144 and down-chirp portion data 146 includes parameter values describing a functional form of each portion. For example, when the frequency profile is a sawtooth wave profile, relevant parameters for each of the up-chirp and down-chirp portions include respective slope values and sampling rates.

In addition, the up-chirp portion data 144 includes doppler frequency data 145 representing a respective doppler frequency for each up-chirp portion. Further, the down-chirp portion data 146 includes doppler frequency data 147 representing a respective doppler frequency for each down-chirp portion. Further details of the doppler frequencies are discussed with regard to FIG. 4.

The illumination system 150 is configured and arranged to produce the illumination that is reflected from the surface 112 of the object 110. As shown in FIG. 1, this illumination takes the form of multiple beams 190(1), . . . , 190(N) of radiation directed along the z-axis. The illumination system 150 includes a scanning mechanism 152, which includes a laser array 154, and an aperture 170.

The scanning/tracking mechanism 152 is configured and arranged to move the laser array 154 in a scanning and/or tracking motion. As shown in FIG. 1, the scanning/tracking mechanism 152 is configured to move each laser in the laser array 154 substantially along the x and y directions, i.e., orthogonally to the direction of the beams 190(1), . . . , 190(N). The scanning/tracking mechanism 152 moves the laser array 154 altogether, so that all movements are performed in one motion.

The laser array 154 is configured and arranged to produce an array of beams (e.g., beams 190(1), . . . , 190(N)) of laser radiation, i.e., substantially coherent, quasi-monochromatic light. In many arrangements, the laser array 154 includes a rectangular array of lasers, each producing laser radiation at some wavelength. Each laser in the rectangular array corresponds to a sample point on the surface 112 of the object 110 where the beam produced by that laser reflects off the surface 112. In some arrangements, the wavelength of the light in each beam 190(1), . . . , 190(N) produced by the laser array 154 is 1550 nm. This wavelength has the advantage of being suited to objects that are, for example, human faces. Nevertheless, other wavelengths (e.g., 1064 nm, 532 nm) may be used as well.

The receiver system 160 is configured and arranged to receive the beams reflected from the surface 112 of the object 110 and generate the displacement datasets 140(1), . . . , 140(T) from the received beams. The receiver system 160 may generate the LIDAR data 142 using any number of known techniques (e.g., heterodyne detection) and will not be discussed further. The receiver system includes a detector 180 that is configured and arranged to convert the received beams into electrical signals from which the receiver system 160 may generate the LIDAR data 142. In some arrangements, the detector 180 includes a photomultiplier tube (PMT) or an array of charge-coupled devices (CCDs).

The audio signal manager 170 is configured to derive portions of an audio signal to produce audio signal (or signal of interest (SOI)) data 172 representing the audio signal. The derivation of the portions of the audio signal—and ultimately, the audio signal itself—is based on differences between doppler frequency data 145 or 147 for adjacent up-chirp or down-chirp portions, respectively. Further detail concerning the audio signal manager is discussed with regard to FIG. 4.

Figure 2:
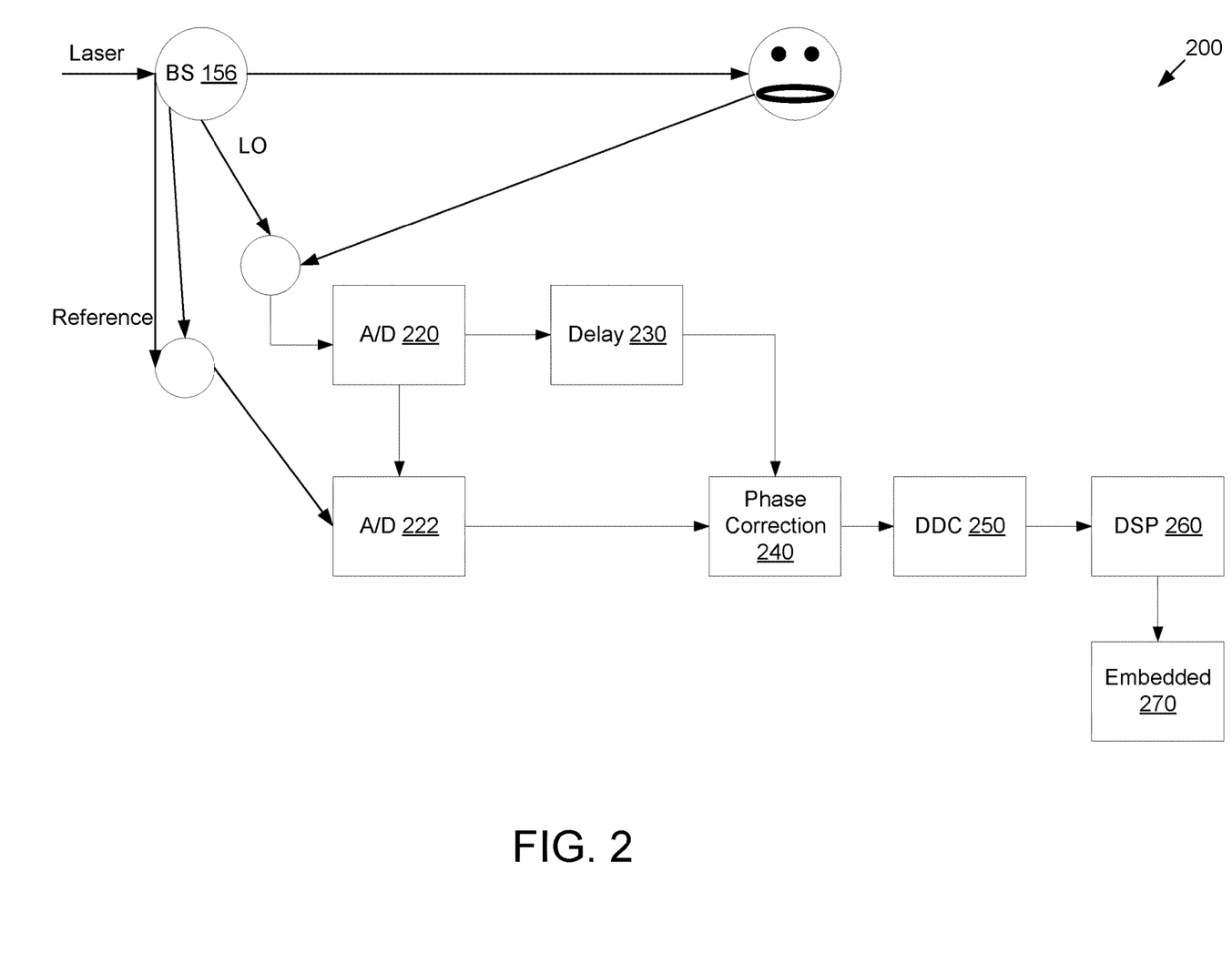
FIG. 2 is another diagram further illustrating the example FMCW LIDAR system.

In FMCW-based LIDAR SOI processing system, frequencies measured by laser are converted to SOI signal. The basic structure of the system is shown in FIG. 2. FIG. 2 is a diagram illustrating an example system 200 for performing acceleration-based fast SOI processing. In FIG. 2, the laser beam is split at beam splitter 156 into LO, reference, and transmitted beams. The transmitted beam is transmitted to the target, reflected to receiver, and mixed with the LO to generate a signal having a (beat) frequency that is the difference between received and transmitted frequencies. This signal is sent through an analog/digital (A/D) converter 220 to a delay 230 for adjusting the phase of the signal. The reference interferometer signal is digitized at the analog/digital (A/D) converter 222 and passes through high speed processing at the phase correction module 240 and is added to the signal from the delay 230 to generate a phase correction signal to correct the phase of beat frequency signal. The phase-corrected signal goes to a digital down-converter (DDC) 250 to be down-converted to lower sampling rate and is sent to a digital signal processor (DSP) 260 to calculate the beat frequency, typically using a Fourier transform and peak-pick algorithm. In an embedded processor 270 (e.g., running audio signal manager 170), this frequency is used to calculate the range R(n). If the target is moving or vibrating, R(n) will also contain a Doppler frequency shift, which contains the target velocity information. This velocity information of the target surface is converted to a vibration signal which contains audible frequencies.

Figure 3A:
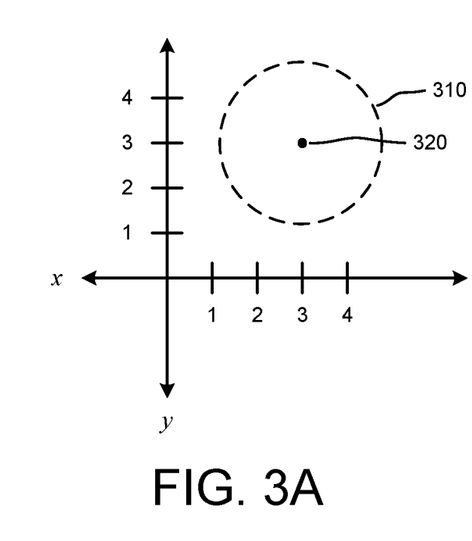
FIG. 3A is a diagram illustrating an example object being tracked within the system illustrated in FIG. 1.
Figure 3B:
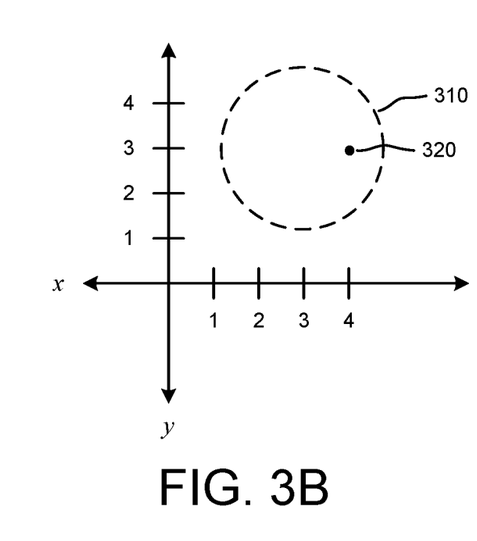
FIG. 3B is a diagram illustrating the example object as tracked within the system illustrated in FIG. 1.

FIGS. 3A and 3B illustrate an example object 310 that may be observed by (e.g., targeted by) the FMCW LIDAR system 120. The object 310 may have any shape but is represented in FIGS. 3A and 3B as a circle. In FIG. 3A, at time T1 a point 320 on the object 310 is being observed by the FMCW LIDAR system 120. At time T1 the point 320 is located at (3,3) in the (x,y) plane. As illustrated in FIG. 3B, at time T2 the point 320 is located at (4,3) in the (x,y) plane. The movement of the point may be the result of different types of movements of the object 320. For example, the object 320 may have moved from one location to another (translational movement) or the object 320 may have rotated (for example, about an axis parallel to the y axis of the x-y plane).

Figure 3C:
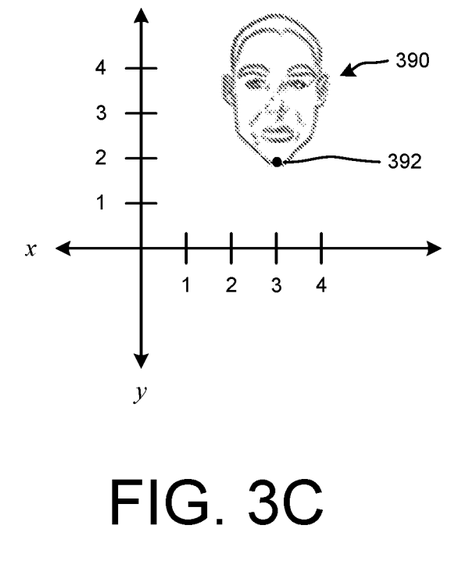
FIG. 3C is a diagram illustrating another example object being tracked within the system illustrated in FIG. 1.
Figure 3D:
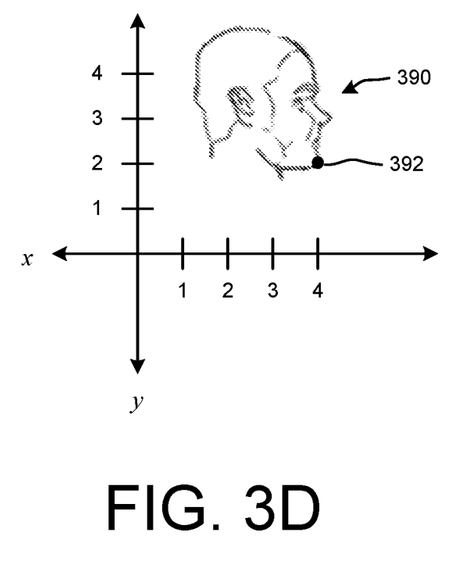
FIG. 3D is a diagram illustrating the other example object as tracked within the system illustrated in FIG. 1.
Figure 3E:
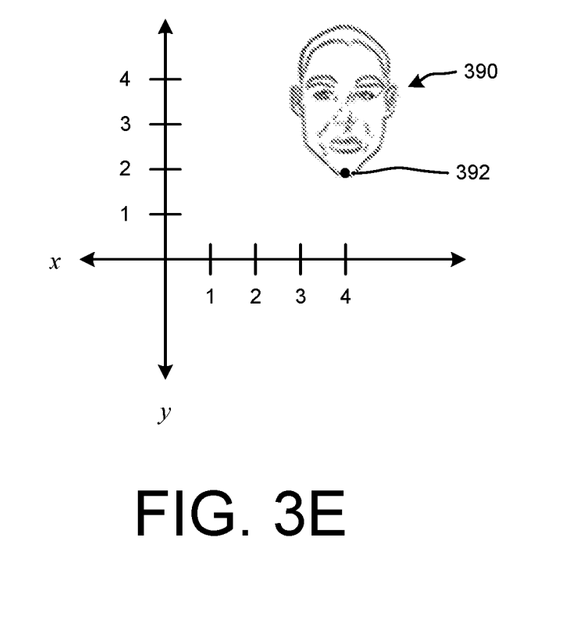
FIG. 3E is a diagram illustrating the other example object as further tracked within the system illustrated in FIG. 1.

As illustrated in FIGS. 3C, 3D, and 3E a head or face 390 of an individual may be tracked or observed by the FMCW LIDAR system 120. Specifically, a point or location 392 of the head or face 390 may be observed. As illustrated in FIG. 3C, at time T1 the point 392 is located at (3,2) in the (x,y) plane. At time T2 the point 392 may be observed to be at (4,2). The movement of the point may be the result of different types of motion. For example, the person or individual may have rotated their head (for example, about an axis parallel to the y axis), as illustrated in FIG. 3D. Alternatively, the person or individual may have moved their head (without any rotation), as illustrated in FIG. 3E.

Figure 4:
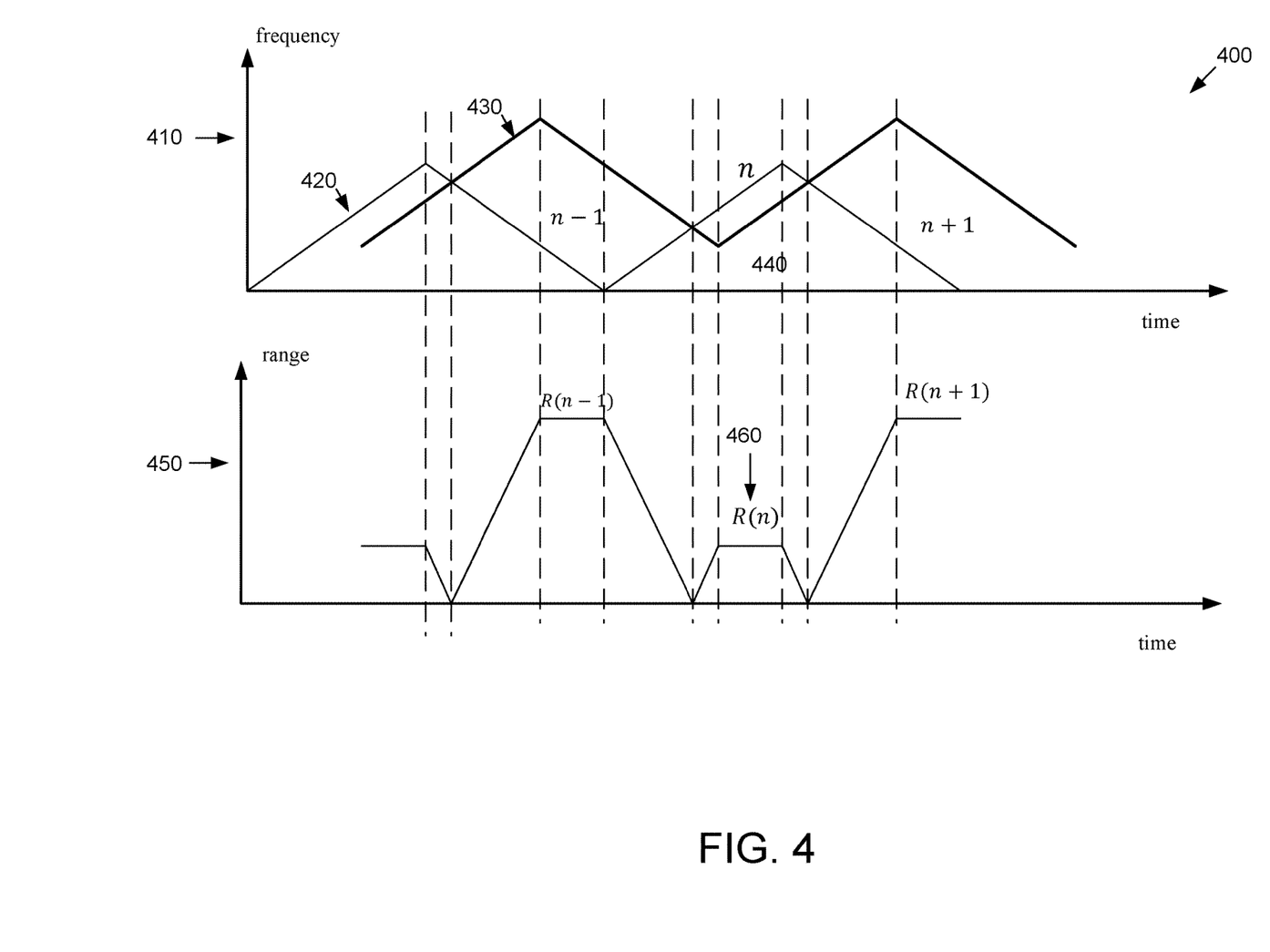
FIG. 4 is a diagram that illustrates a waveform of a FMCW LIDAR range measurement system and the subsequent, measured range.

FIG. 4 is a diagram that illustrates a waveform of a FMCW LIDAR range measurement system 400 and the subsequent, measured range. The FMCW LIDAR transmits a signal 420 including an up-chirp and down-chirp. In the up-chirp, the transmitted laser frequency increases linearly, and in the down-chirp the transmitted laser frequency decreases linearly. The chirp duration is 0.125 ms, so the target speed is sampled at an 8 kHz sampling rate. Differing target range and velocity will result in different beat frequencies. Measuring this frequency allows for measurement of the target range and velocity.

In FIG. 4, the current range R(n) is calculated according to the time duration τ the light has traveled, which can be calculated according to the frequency difference between the received signal 420 and the transmitted signal 430. This measured range 460 contains the real range r(n) between the target and the receiver, and the Doppler frequency 440 $f_D(n)$ caused by the target movement. $R(n)=r(n)-f_D(n)/\alpha$. Here α is the chirp rate (typically 2 MHz per meter in FSS system). Also, at the previous sweep (here it's a down-chirp) $R(n-1)=r(n-1)+f_D(n-1)/\alpha$. At the next sweep (here it's also a down-chirp) $R(n+1)=r(n+1)+f_D(n+1)/\alpha$. If we take the difference between range measurements at sweeps n+1 and n-1, we will get the audio signal $$s(2n) = R(n+1) - R(n-1) = [r(n+1) - r(n-1)] + \frac{[f_D(n+1) - f_D(n-1)]}{\alpha}.$$

$f_D(n)$ is proportional to the target speed v(n). After ignoring the real range difference r(n+1)−r(n−1), which is very small compared with Doppler frequency difference, and converting Doppler frequency to target speed, the audio signal from two consecutive down-chirps will be $$s(2n)=\beta[v(n+1)-v(n-1)].$$

Here $$\beta = \frac{1}{\alpha\lambda}$$

(λ is the transmitter laser wavelength), is a constant.

Above s(2n)/β is target's velocity difference from time n−1 to time n+1.

If the target movement contains a translational movement and vibration movement, and the translational velocity is approximately constant between two consecutive down-chirps (or up-chirps), from the formula of s(2n) we can find the constant translational velocity will be canceled. Only the difference of vibration velocities appears in this formula (the acceleration of vibration). But the velocity-based algorithm can't cancel this translational velocity, and it becomes the DC component in the vibration signal. This is why a high attenuation band-pass filter is needed to remove this DC component in velocity-based vibration processing. This acceleration-based algorithm doesn't need this filter, so it reduces the computation significantly. It will not cause any filtering delay, so it's easy to synchronize this vibration signal with other real-time data, such as when we try to use SNR to track the range measurements to exclude some bad points due to laser speckle.

Figure 5:
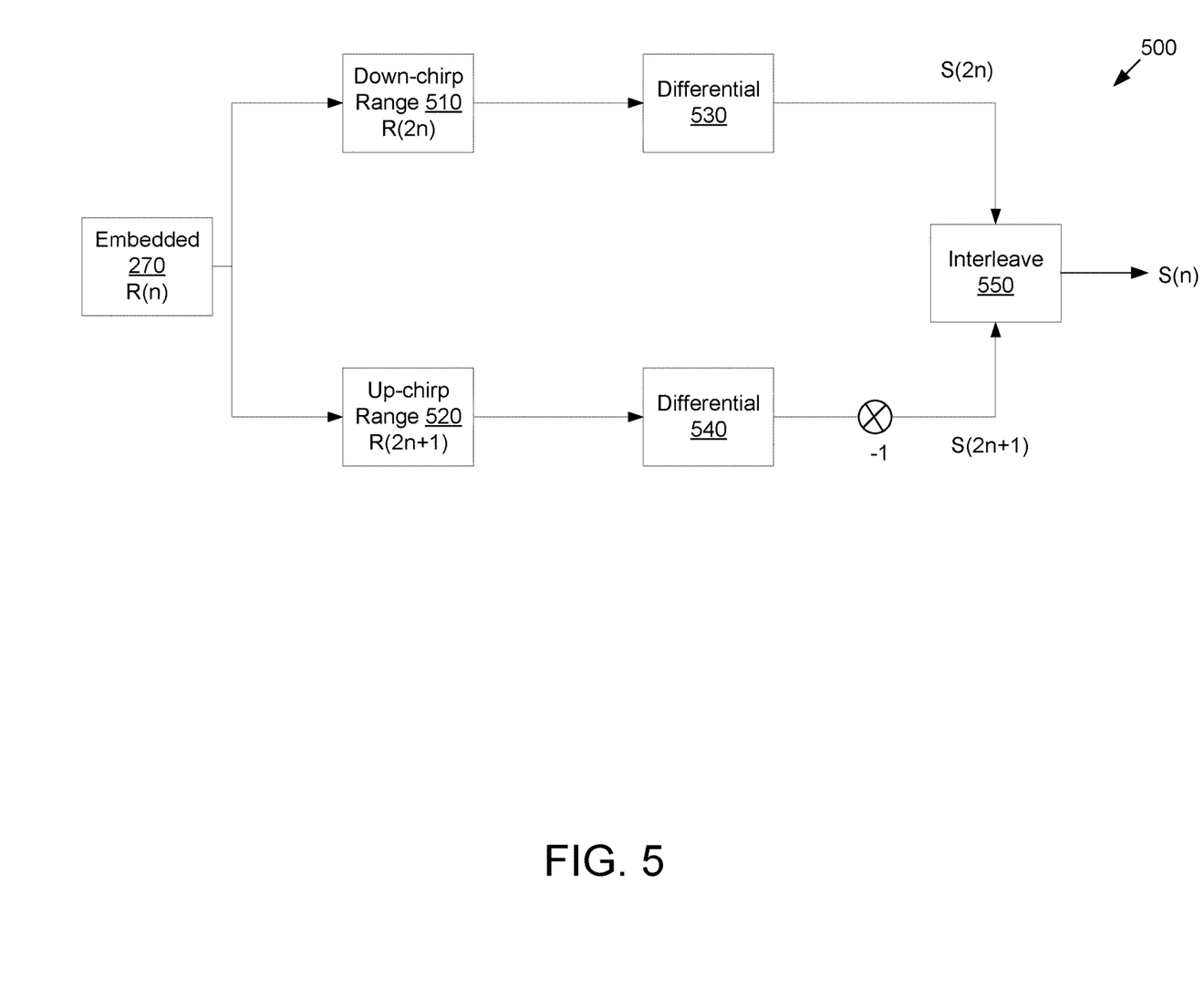
FIG. 5 is a diagram illustrating an example system for interleaving audio signals from a down-chirp waveform and an up-chirp waveform.

FIG. 5 is a diagram illustrating an example system 500 for interleaving audio signals from a down-chirp waveform and an up-chirp waveform. The difference 530 between two consecutive down-sweep ranges 510 results in an audio signal s(2n) sampled at a 4 kHz rate (half the system chirp rate). The same processing for the difference 540 between two consecutive up-sweep ranges 520 is performed and also results in another audio signal s(2n+1) at a 4 kHz sampling rate. These two audio signals are interleaved 550 to form an audio signal s(n) at an 8 kHz sampling rate as shown in FIG. 5, which is the vibration processing part after the embedded processor calculates the range R(n).

In addition to the reduced computation, acceleration-based processing has also some advantages over velocity-based processing in audio quality. Due to nature of the frequency response on some surfaces like human faces, our velocity-based processing lacks higher frequency signal components. The acceleration-based processing tends to boost the higher frequency and gives more pleasing tonal quality and more intelligible speech. Some subjective testing has shown this advantage. A simple analysis can also show this: if velocity is v(t)=A sin(ωt), the acceleration will be $$a(t) = \frac{dv(t)}{dt} = A\omega\cos(\omega t),$$

showing that the frequency is linearly boosted.

Another advantage for acceleration-based processing is that it will not be affected by the structural difference between up-chirp and down-chirp. In real-world laser modulation systems, up-chirp and down-chirp segments have small differences such as different non-linear phase structure, different mean frequencies, and so on. Velocity-based processing takes the difference between up-chirp and down-chirp, and this up-chirp and down-chirp difference will introduce some artifacts into the vibration signal. Acceleration-based processing takes difference between two consecutive up-chirps (or down-chirps), and the structural difference between up-chirp and down-chirp is not introduced into the vibration signal. To summarize:

- The improved techniques described herein improve audio SNR by subtracting out stationary noise and low acceleration components of the signal. This is particularly important for the noise that comes from slowly-varying systematic differences between the up and down chirp signals. Differences between the up and down chirp that are not related to range or velocity can come from residual differences in chirp non-linearity, and also from differing multipath effects due to slightly different wavelength span and the reversal of chirp direction.
- No additional filter is required to remove DC and low frequency parts of the surface motion. This reduces computational load and eliminates signal group delay from the high-order band-pass filter that is required with previous signal processing methods.
- The improved techniques described herein boost high frequency signal components to compensate for reduced high frequency from some surfaces.

Figure 6:
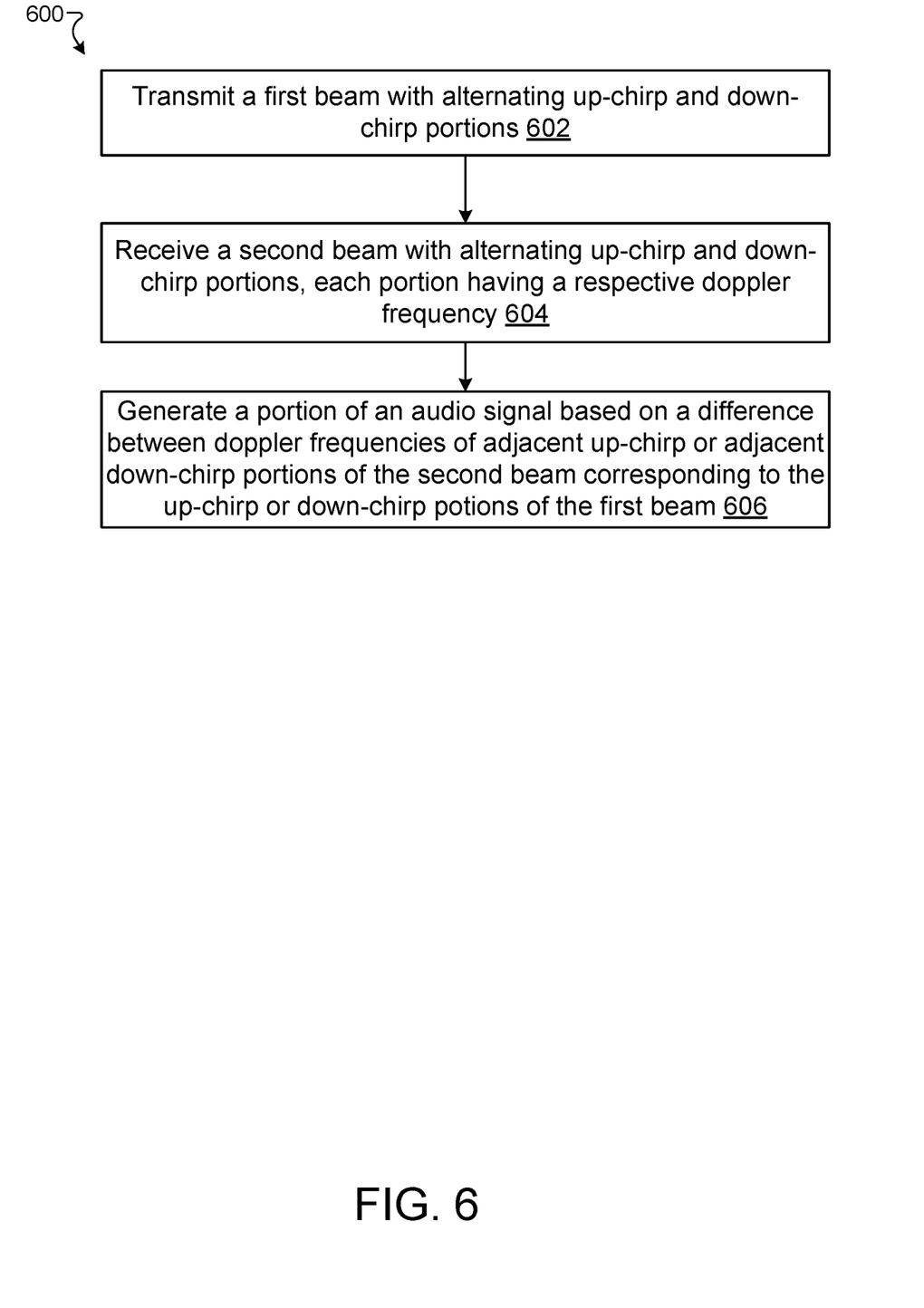
FIG. 6 is a flow chart illustrating an example method of performing the acceleration-based fast SOI processing according to the improved techniques.

FIG. 6 is a flow chart illustrating an example method 600 of performing the acceleration-based fast SOI processing described herein. The method 600 may be performed by constructs described in connection with FIG. 1, which can reside in memory 126 of the tracking system 120 and can be executed by the processing circuitry 124.

At 602, the beam transmission manager 130 transmits, from a source, a first beam of electromagnetic radiation (e.g., represented by first beam data 132) toward a remote object (e.g., object 110) moving with respect to the source, the first beam including a sequence of up-chirp portions (e.g., represented by up-chirp portion data 134) and a sequence of down-chirp portions (e.g., represented by down-chirp portion data 136) such that an up-chirp portion of the sequence of up-chirp portions is followed by a down-chirp portion of the sequence of down-chirp portions, and the down-chirp portion is followed by an adjacent up-chirp portion of the sequence of up-chirp portions, each up-chirp portion of the sequence of up-chirp portions having a frequency that increases over time, each down-chirp portion of the sequence of down-chirp portions having a frequency that decreases over time.

At 604, the beam receiving manager 140 receives a second beam of electromagnetic radiation (e.g., represented by second beam data 142) reflected from the remote object, the second beam including a sequence of up-chirp portions (e.g., up-chirp portion data 144) and a sequence of down-chirp portions (e.g., down-chirp portion data 146) such that an up-chirp portion of the sequence of up-chirp portions is followed by a down-chirp portion of the sequence of down-chirp portions, and the down-chirp portion is followed by an adjacent up-chirp portion of the sequence of up-chirp portions, each of the sequences of up-chirp portions and down-chirp portions of the second beam having a respective doppler frequency of a sequence of doppler frequencies (e.g., doppler frequency data 145 and 147), each up-chirp portion of the sequence of up-chirp portions of the second beam corresponding to a respective up-chirp portion of the sequence of up-chirp portions of the first beam, each down-chirp portion of the sequence of down-chirp portions of the second beam corresponding to a respective down-chirp portion of the sequence of down-chirp portions of the first beam.

At 606, the audio signal manager 170 generates a portion of an audio signal (e.g., represented by audio signal/SOI data 172) based on a difference between one of (i) a first doppler frequency of a first up-chirp portion of the sequence of up-chirp portions of the second beam corresponding to a first up-chirp portion of the sequence of up-chirp portions of the first beam and a second doppler frequency of a second up-chirp portion of the sequence of up-chirp portions of the second beam corresponding to a second up-chirp portion of the sequence of up-chirp portions of the first beam and (ii) a third doppler frequency of a first down-chirp portion of the sequence of down-chirp portions of the second beam corresponding to a first down-chirp portion of the sequence of down-chirp portions of the first beam and a fourth doppler frequency of a second down-chirp portion of the sequence of down-chirp portions of the second beam corresponding to a second down-chirp portion of the sequence of down-chirp portions of the first beam.

In some implementations, one or more portions of the components shown in, for example, the system 200 and/or the system 500 in FIGS. 2 and 5 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the system 400 can be, or can include, a software module configured for execution by at least one processor (not shown). In some implementations, the functionality of the components can be included in different modules and/or different components than those shown in FIGS. 2 and 5.

In some embodiments, one or more of the components of the system 200 can be, or can include, processors configured to process instructions stored in a memory. For example, the phase correction 240 (and/or a portion thereof) can be a combination of a processor and a memory configured to execute instructions related to a process to implement one or more functions.

Although not shown, in some implementations, the components of the system 100 (or portions thereof) can be configured to operate within, for example, a data center (e.g., a cloud computing environment), a computer system, one or more server/host devices, and/or so forth. In some implementations, the components of the system 100 (or portions thereof) can be configured to operate within a network. Thus, the system 100 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, a memory can be any type of memory such as a random-access memory, a disk drive memory, flash memory, and/or so forth. In some implementations, the memory can be implemented as more than one memory component (e.g., more than one RAM component or disk drive memory) associated with the components of the system 100.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:
transmitting, from a source, a first beam of electromagnetic radiation toward a remote object moving with respect to the source, the first beam including a sequence of up-chirp portions and a sequence of down-chirp portions such that an up-chirp portion of the sequence of up-chirp portions is followed by a down-chirp portion of the sequence of down-chirp portions, and the down-chirp portion is followed by an adjacent up-chirp portion of the sequence of up-chirp portions, each up-chirp portion of the sequence of up-chirp portions having a frequency that increases over time, each down-chirp portion of the sequence of down-chirp portions having a frequency that decreases over time;
receiving a second beam of electromagnetic radiation reflected from the remote object, the second beam including a sequence of up-chirp portions and a sequence of down-chirp portions such that an up-chirp portion of the sequence of up-chirp portions is followed by a down-chirp portion of the sequence of down-chirp portions, and the down-chirp portion is followed by an adjacent up-chirp portion of the sequence of up-chirp portions, each of the sequences of up-chirp portions and down-chirp portions of the second beam having a respective doppler frequency of a sequence of doppler frequencies, each up-chirp portion of the sequence of up-chirp portions of the second beam corresponding to a respective up-chirp portion of the sequence of up-chirp portions of the first beam, each down-chirp portion of the sequence of down-chirp portions of the second beam corresponding to a respective down-chirp portion of the sequence of down-chirp portions of the first beam; and generating a portion of an audio signal based on a difference between one of (i) a first doppler frequency of a first up-chirp portion of the sequence of up-chirp portions of the second beam corresponding to a first up-chirp portion of the sequence of up-chirp portions of the first beam and a second doppler frequency of a second up-chirp portion of the sequence of up-chirp portions of the second beam corresponding to a second up-chirp portion of the sequence of up-chirp portions of the first beam and (ii) a third doppler frequency of a first down-chirp portion of the sequence of down-chirp portions of the second beam corresponding to a first down-chirp portion of the sequence of down-chirp portions of the first beam and a fourth doppler frequency of a second down-chirp portion of the sequence of down-chirp portions of the second beam corresponding to a second down-chirp portion of the sequence of down-chirp portions of the first beam.

2. The method as in claim 1, wherein the frequency of each up-chirp portion of the sequence of up-chirp portions of the first beam increases linearly over time and the frequency of each down-chirp portion of the sequence of down-chirp portions of the first beam decreases linearly over time.

3. The method as in claim 2, wherein a rate of increase of frequency over time of each up-chirp portion of the sequence of up-chirp portions of the first beam is equal, in absolute value, to a rate of decrease of frequency over time of each down-chirp portion of the sequence of down-chirp portions of the first beam.

4. The method as in claim 1, wherein an amplitude of the portion of the audio signal is proportional to the difference between one of (i) the first doppler frequency and the second doppler frequency and (ii) the third doppler frequency and the fourth doppler frequency.

5. The method as in claim 4, wherein the frequency of each up-chirp portion of the sequence of up-chirp portions of the first beam increases at a rate linearly over time and the frequency of each down-chirp portion of the sequence of down-chirp portions of the first beam decreases at the rate linearly over time, and wherein a constant of proportionality between the amplitude of the portion of the audio signal and the difference between the one of (i) the first doppler frequency and the second doppler frequency and (ii) the third doppler frequency and the fourth doppler frequency.

6. The method as in claim 1, further comprising:

concatenating a first portion of the audio signal and a second portion of the audio signal to form a full portion of the audio signal, the first portion being based on the difference between first doppler frequency and the second doppler frequency, the second portion being based on the difference between the third doppler frequency and the fourth doppler frequency.

7. The method as in claim 1, wherein the source is a laser of a frequency modulated, continuous-wave (FMCW) LIDAR system.

8. A computer program product comprising a nontransitory storage medium, the computer program product including code that, when executed by processing circuitry of a frequency modulated, continuous-wave (FMCW) LIDAR system, causes the processing circuitry to perform a method, the method comprising:

transmitting, from a source of the FMCW LIDAR system, a first beam of electromagnetic radiation toward a remote object moving with respect to the source, the first beam including a sequence of up-chirp portions and a sequence of down-chirp portions such that an up-chirp portion of the sequence of up-chirp portions is followed by a down-chirp portion of the sequence of down-chirp portions, and the down-chirp portion is followed by an adjacent up-chirp portion of the sequence of up-chirp portions, each up-chirp portion of the sequence of up-chirp portions having a frequency that increases over time, each down-chirp portion of the sequence of down-chirp portions having a frequency that decreases over time;

receiving a second beam of electromagnetic radiation reflected from the remote object, the second beam including a sequence of up-chirp portions and a sequence of down-chirp portions such that an up-chirp portion of the sequence of up-chirp portions is followed by a down-chirp portion of the sequence of down-chirp portions, and the down-chirp portion is followed by an adjacent up-chirp portion of the sequence of up-chirp portions, each of the sequences of up-chirp portions and down-chirp portions of the second beam having a respective doppler frequency of a sequence of doppler frequencies, each up-chirp portion of the sequence of up-chirp portions of the second beam corresponding to a respective up-chirp portion of the sequence of up-chirp portions of the first beam, each down-chirp portion of the sequence of down-chirp portions of the second beam corresponding to a respective down-chirp portion of the sequence of down-chirp portions of the first beam; and generating a portion of an audio signal based on a difference between one of (i) a first doppler frequency of a first up-chirp portion of the sequence of up-chirp portions of the second beam corresponding to a first up-chirp portion of the sequence of up-chirp portions of the first beam and a second doppler frequency of a second up-chirp portion of the sequence of up-chirp portions of the second beam corresponding to a second up-chirp portion of the sequence of up-chirp portions of the first beam and (ii) a third doppler frequency of a first down-chirp portion of the sequence of down-chirp portions of the second beam corresponding to a first down-chirp portion of the sequence of down-chirp portions of the first beam and a fourth doppler frequency of a second down-chirp portion of the sequence of down-chirp portions of the second beam corresponding to a second down-chirp portion of the sequence of down-chirp portions of the first beam.

9. The computer program product as in claim 8, wherein the frequency of each up-chirp portion of the sequence of up-chirp portions of the first beam increases linearly over time and the frequency of each down-chirp portion of the sequence of down-chirp portions of the first beam decreases linearly over time.

10. The computer program product as in claim 9, wherein a rate of increase of frequency over time of each up-chirp portion of the sequence of up-chirp portions of the first beam is equal, in absolute value, to a rate of decrease of frequency over time of each down-chirp portion of the sequence of down-chirp portions of the first beam.

11. The computer program product as in claim 8, wherein an amplitude of the portion of the audio signal is proportional to the difference between one of (i) the first doppler frequency and the second doppler frequency and (ii) the third doppler frequency and the fourth doppler frequency.

12. The computer program product as in claim 11, wherein the frequency of each up-chirp portion of the sequence of up-chirp portions of the first beam increases at a rate linearly over time and the frequency of each down-chirp portion of the sequence of down-chirp portions of the first beam decreases at the rate linearly over time, and wherein a constant of proportionality between the amplitude of the portion of the audio signal and the difference between the one of (i) the first doppler frequency and the second doppler frequency and (ii) the third doppler frequency and the fourth doppler frequency.

13. The computer program product as in claim 8, wherein the method further comprises:

concatenating a first portion of the audio signal and a second portion of the audio signal to form a full portion of the audio signal, the first portion being based on the difference between first doppler frequency and the second doppler frequency, the second portion being based on the difference between the third doppler frequency and the fourth doppler frequency.

14. The method as in claim 1, wherein the source is a laser of an FMCW LIDAR system.

15. A frequency modulated, continuous-wave (FMCW) LIDAR system, comprising:

an apparatus configured to transmit, from a source of the FMCW LIDAR system, a first beam of electromagnetic radiation toward a remote object moving with respect to the source, the first beam including a sequence of up-chirp portions and a sequence of down-chirp portions such that an up-chirp portion of the sequence of up-chirp portions is followed by a down-chirp portion of the sequence of down-chirp portions, and the down-chirp portion is followed by an adjacent up-chirp portion of the sequence of up-chirp portions, each up-chirp portion of the sequence of up-chirp portions having a frequency that increases over time, each down-chirp portion of the sequence of down-chirp portions having a frequency that decreases over time;

an apparatus configured to receive a second beam of electromagnetic radiation reflected from the remote object, the second beam including a sequence of up-chirp portions and a sequence of down-chirp portions such that an up-chirp portion of the sequence of up-chirp portions is followed by a down-chirp portion of the sequence of down-chirp portions, and the down-chirp portion is followed by an adjacent up-chirp portion of the sequence of up-chirp portions, each of the sequences of up-chirp portions and down-chirp portions of the second beam having a respective doppler frequency of a sequence of doppler frequencies, each up-chirp portion of the sequence of up-chirp portions of the second beam corresponding to a respective up-chirp portion of the sequence of up-chirp portions of the first beam, each down-chirp portion of the sequence of down-chirp portions of the second beam corresponding to a respective down-chirp portion of the sequence of down-chirp portions of the first beam; and a computing device including memory and controlling circuitry coupled to the memory, the controlling circuitry being configured to generate a portion of an audio signal based on a difference between one of (i) a first doppler frequency of a first up-chirp portion of the sequence of up-chirp portions of the second beam corresponding to a first up-chirp portion of the sequence of up-chirp portions of the first beam and a second doppler frequency of a second up-chirp portion of the sequence of up-chirp portions of the second beam corresponding to a second up-chirp portion of the sequence of up-chirp portions of the first beam and (ii) a third doppler frequency of a first down-chirp portion of the sequence of down-chirp portions of the second beam corresponding to a first down-chirp portion of the sequence of down-chirp portions of the first beam and a fourth doppler frequency of a second down-chirp portion of the sequence of down-chirp portions of the second beam corresponding to a second down-chirp portion of the sequence of down-chirp portions of the first beam.

16. The FMCW LIDAR system as in claim 15, wherein the frequency of each up-chirp portion of the sequence of up-chirp portions of the first beam increases linearly over time and the frequency of each down-chirp portion of the sequence of down-chirp portions of the first beam decreases linearly over time.

17. The FMCW LIDAR system as in claim 16, wherein a rate of increase of frequency over time of each up-chirp portion of the sequence of up-chirp portions of the first beam is equal, in absolute value, to a rate of decrease of frequency over time of each down-chirp portion of the sequence of down-chirp portions of the first beam.

18. The FMCW LIDAR system as in claim 15, wherein an amplitude of the portion of the audio signal is proportional to the difference between one of (i) the first doppler frequency and the second doppler frequency and (ii) the third doppler frequency and the fourth doppler frequency.

19. The FMCW LIDAR system as in claim 18, wherein the frequency of each up-chirp portion of the sequence of up-chirp portions of the first beam increases at a rate linearly over time and the frequency of each down-chirp portion of the sequence of down-chirp portions of the first beam decreases at the rate linearly over time, and wherein a constant of proportionality between the amplitude of the portion of the audio signal and the difference between the one of (i) the first doppler frequency and the second doppler frequency and (ii) the third doppler frequency and the fourth doppler frequency.

20. The FMCW LIDAR system as in claim 15, wherein the controlling circuitry is further configured to:

concatenate a first portion of the audio signal and a second portion of the audio signal to form a full portion of the audio signal, the first portion being based on the difference between first doppler frequency and the second doppler frequency, the second portion being based on the difference between the third doppler frequency and the fourth doppler frequency.

* * * * *